United States Patent [19]

Smith et al.

[11] Patent Number: 4,793,435
[45] Date of Patent: Dec. 27, 1988

[54] APPARATUS FOR GENERATING MULTIPLE SEISMIC SIGNALS IN A WELLBORE

[75] Inventors: Lonnie J. Smith, Allen; Charles C. Mosher, Plano, both of Tex.

[73] Assignee: Atlantic Richfield Company, Los Angeles, Calif.

[21] Appl. No.: 97,783

[22] Filed: Sep. 17, 1987

[51] Int. Cl.$^4$ ............................................. G01V 1/40
[52] U.S. Cl. ................................... 181/106; 181/113; 181/116; 181/103
[58] Field of Search ............... 181/102, 103, 104, 106, 181/113, 116; 367/911; 102/313, 320

[56] References Cited

U.S. PATENT DOCUMENTS

| | | | |
|---|---|---|---|
| 2,871,784 | 2/1959 | Blair | 102/320 |
| 3,768,408 | 10/1973 | Hallmark | 102/320 |
| 4,208,966 | 6/1980 | Hart | 102/313 |
| 4,284,006 | 4/1981 | Davis | 181/116 |
| 4,286,520 | 9/1981 | Davis | 181/116 |

Primary Examiner—Thomas H. Tarcza
Assistant Examiner—Ian J. Lobo
Attorney, Agent, or Firm—Michael E. Martin

[57] ABSTRACT

Multiple downhole seismic signals are generated by an apparatus comprising one or more elongated rod segments insertable in a borehole and provide with spaced-apart predetermined lengths of Primacord explosive charge helically wrapped on the exterior of the rod segment and spaced apart by circumferential baffles supported on the rod segment. The charges are selectively fired through a motor actuated selector switch and a switch stepping and firing circuit including only two conductors and blocking diodes for imposing signals of opposite polarity on the selector switch and its actuating motor.

8 Claims, 2 Drawing Sheets

APPARATUS FOR GENERATING MULTIPLE SEISMIC SIGNALS IN A WELLBORE

BACKGROUND OF THE INVENTION

1. Field of the Invention

The present invention pertains to an apparatus adapted to be lowered into a wellbore for selectively generating multiple controlled explosions to provide seismic signals suitable for exploration for mineral values.

2. Background

In exploration for subterranean mineral values, one technique which has proven successful is known generally as vertical seismic profiling. This exploration process involves placing a geophone sonde in a borehole and generating seismic signals on the surface or, in the case of an inverted vertical seismic profile, the seismic signal is generated in the borehole and an array of geophones is placed on the earth's surface. The latter technique has been successfully used to collect seismic data as discussed in a paper entitled, "An InSitu Analysis of 3-D Seismic Lateral Resolution" presented at the 55th Annual Society of Exploration Geophysicists Meeting in 1985, by the authors, Charles C. Mosher and Ian A. Mason.

One disadvantage with conventional inverted vertical seismic profiles is the time required to set up and fire a seismic signal generator. Conventional borehole seismic signal sources may utilize an explosive source such as a length of Primacord explosive. Although the Primacord type explosive can be easily tailored to minimize or prevent damage to the wellbore and its casing, the time required for winching the support mechanism for the explosive to the surface, reloading the explosive and lowering the explosive to the next point of signal generation is disadvantageous to the above-mentioned type of exploration process. Moreover, not only is it desirable to avoid the time consuming process of retrieving and reloading the support for the seismic signal source, but it is also desirable to move the signal source within a borehole to obtain data from various depths or locations with respect to the signal-receiving devices. It is toward the objectives of overcoming the disadvantages of prior art inverted seismic profiling processes and toward enjoying the advantages of having a multiple shot, downhole seismic signal source that the present invention has been directed as will be appreciated by those skilled in the art.

SUMMARY OF THE INVENTION

The present invention provides an apparatus for generating multiple seismic signals in a borehole utilizing plural explosive charges which may be selectively fired at predetermined intervals and at predetermined locations in the borehole. In accordance with an important aspect of the present invention, there is provided a multiple borehole seismic signal source comprising one or more elongated rods on which are coiled predetermined lengths of explosive cordlike material commonly known as Primacord. The Primacord charges are of predetermined length and charge intensity thereby providing for selective predetermination of the charge intensity of the seismic signal. Each explosive cord length is suitably secured to the exterior of the elongated rod and each length of cord is preferably separated from the other lengths by a baffle formed on the rod which may also serve to centralize the rod in the borehole.

In accordance with another aspect of the invention, a multiple, selectable seismic source is provided for insertion in a wellbore wherein a plurality of explosive charges are provided on selected lengths of extension rod member which may be coupled end to end to provide the desired number of signals. The present invention provides an improved system for providing multiple borehole seismic signals which may be provided in a selected predetermined number and a predetermined location in the borehole and wherein the signal intensity of each signal source may be predetermined. The signal source may also be selected to avoid borehole structural damage and damage to the apparatus supporting the explosive charges which provide the signal.

Those skilled in the art will recognize the above-described features and advantages of the present invention together with other superior aspects thereof upon reading the detailed description which follows in conjunction with the drawing.

DESCRIPTION OF A PREFERRED EMBODIMENT

Figure 1:
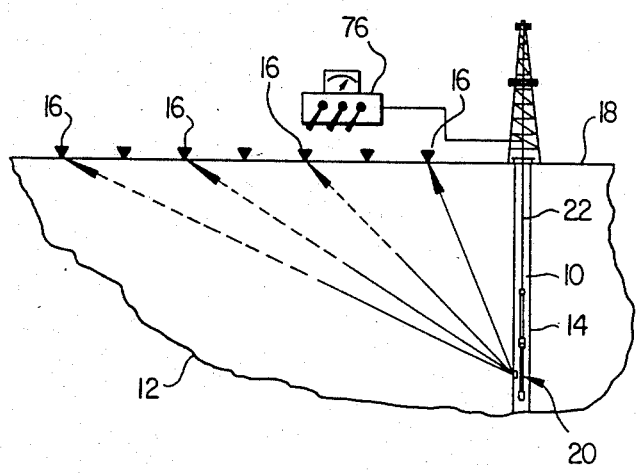
FIG. 1 is a somewhat schematic diagram illustrating the technique of vertical seismic profiling utilizing the present invention.

In the description which follows, like parts are marked throughout the specification and drawing with the same reference numerals, respectively. The drawing figures are not necessarily to scale and certain features of the invention may be shown exaggerated in scale or in somewhat schematic form in the interest of clarity.

Referring to FIG. 1, there is shown a somewhat schematic diagram of the technique of exploration utilizing socalled vertical seismic profiling. In FIG. 1, a borehole 10 has been drilled into an earth formation 12 and may be suitably cased by casing means 14. An array of seismic signal receiving devices 16 is suitably disposed on the earth's surface 18 for receiving signals from a signal source which may be disposed in the borehole 10. In accordance with the present invention, an improved apparatus, generally designated by the numeral 20, is disposed in the borehole 10 for generating multiple explosive charge type seismic signals within the borehole. The apparatus 20 is disposed in the borehole 10 at the lower end of any elongated support and conductor cable 22 which may be of a conventional type utilized in petroleum exploration and production operations and commonly known as a wireline cable. The cable 22 is adapted to be lowered into the wellbore 10 by suitable apparatus of a conventional type, not shown, and known to those skilled in the art of petroleum exploration and production operations.

Figure 2:
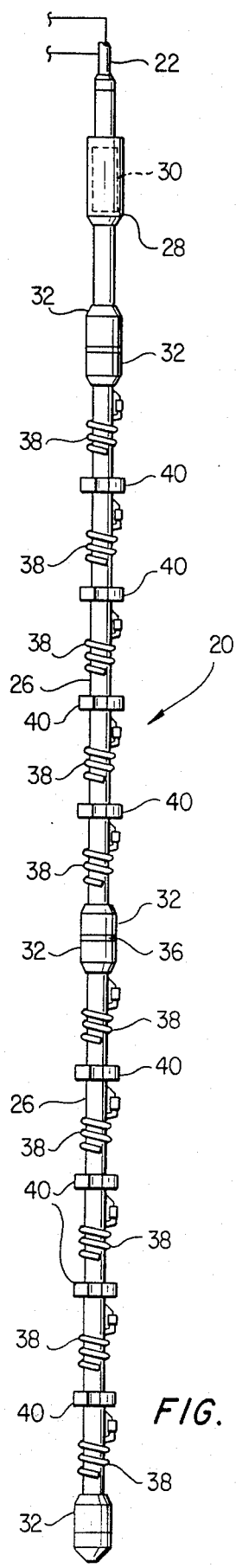
FIG. 2 is an elevation of the apparatus of the present invention.

As illustrated in FIG. 2, the apparatus 20 is preferably characterized by one or more elongated hollow steel rod segments 26 which are adapted to be coupled end to end and lowered into the borehole 10 on the distal end of the cable 22. A head assembly 28 is provided for the apparatus 20 including suitable coupling means for connecting the cable 22 to the apparatus 20. The head assembly 28 is adapted to include a multiple position switch 30 disposed therein and on a type commercially available. One source of the switch 30 is a selector switch utilized in a multiple perforating gun actuating system manufactured by Gearhart Industries, Inc., Fort Worth, Texas, such as a type manufactured by that company and known as a "ten shot select fire multi-gun system."

Figure 3A:
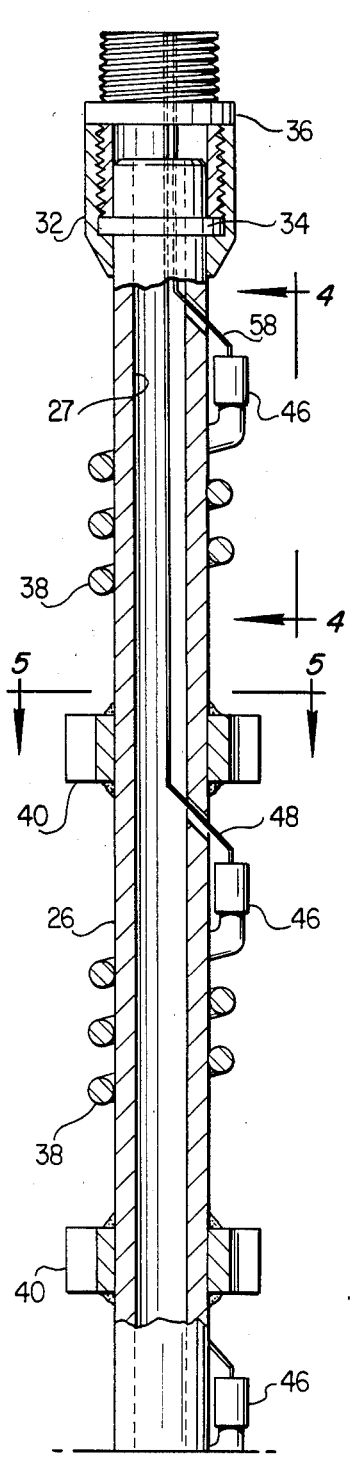
FIGS. 3A and 3B comprise a detail view of one of the rod segments for supporting the explosive charges.
Figure 3B:
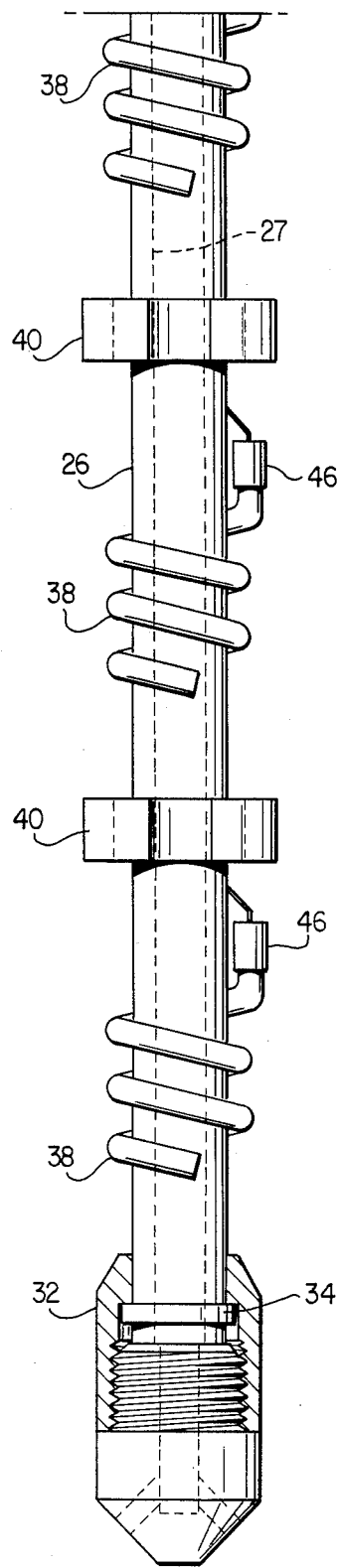
Figure 5:
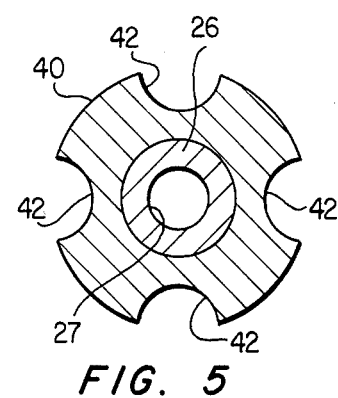
FIG. 5 is a section view taken along the line 5—5 of FIG. 3A.

As shown in FIGS. 3A and 3B, each of the rod segments 26 includes an internal passage 27 extending therethrough and each rod segment is further provided with internally threaded coupling sleeves 32 at its opposite ends which are retained on the rod segments by retaining ring means 34. If multiple rod segments are used in apparatus 20, as indicated in FIG. 2, an externally threaded coupling member 36, FIGS. 2 and 3A, is utilized to couple the rod segments together without rotating the rod segments relative to each other for reasons which will be apparent to those skilled in the art from the following description.

Each of the rod segments 26 is provided with plural explosive charges comprising predetermined lengths of Primacord explosive 38. The explosive charges 38 are preferably wrapped on the exterior of the rod segments 26 in a helical pattern of predetermined length and pitch wherein the charge intensity of each signal source may be predetermined. The explosive charges 38 are separated by spaced-apart generally cylindrical baffles 40 which are suitably secured to the rod segments 26 and are provided with fluid pressure relief ports 42 spaced therearound. The baffles 40 are preferably selected to be of a diameter such that they also function to centralize the apparatus 20 in the wellbore. The diameter of the baffles 40 is also selected to be greater than the maximum diameter of the explosive charges 38 and any attachments thereto so as to minimize any damage to the charges during insertion of the apparatus 20 into the wellbore 10.

Figure 4:
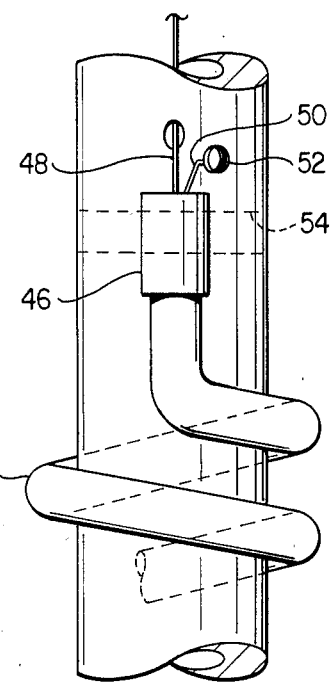
FIG. 4 is a detail view showing the connection of one of the explosive charges to a detonator and to a firing circuit.

Referring further to FIGS. 3A, 3B and 4, each of the explosive charges 38 is connected to a suitable detonator 46 which is electrically activated to detonate the charge 38 connected thereto through a suitable electric circuit to be described in further detail herein. Each of the detonators 46 is connected to a conductor lead such as the lead 48 shown in FIG. 4 and to a ground lead 50 which is suitably connected to the rod segment 26 by a terminal screw 52. Detonators 46 as well as the explosive charges 38 may be secured to the exterior surface of the rod segments 26 by suitable means such as conventional wrapping tape 54, see FIG. 4. By way of example, in FIG. 3A, each of the explosive charges 38 and its associated detonator 46 is connected to a separate conductor lead such as the lead 48 and the lead 58. The leads for each of the explosive charges 38 extend to the switch 30, FIGS. 2 and 6, for selective energization of the respective charges to provide the seismic signal.

Figure 6:
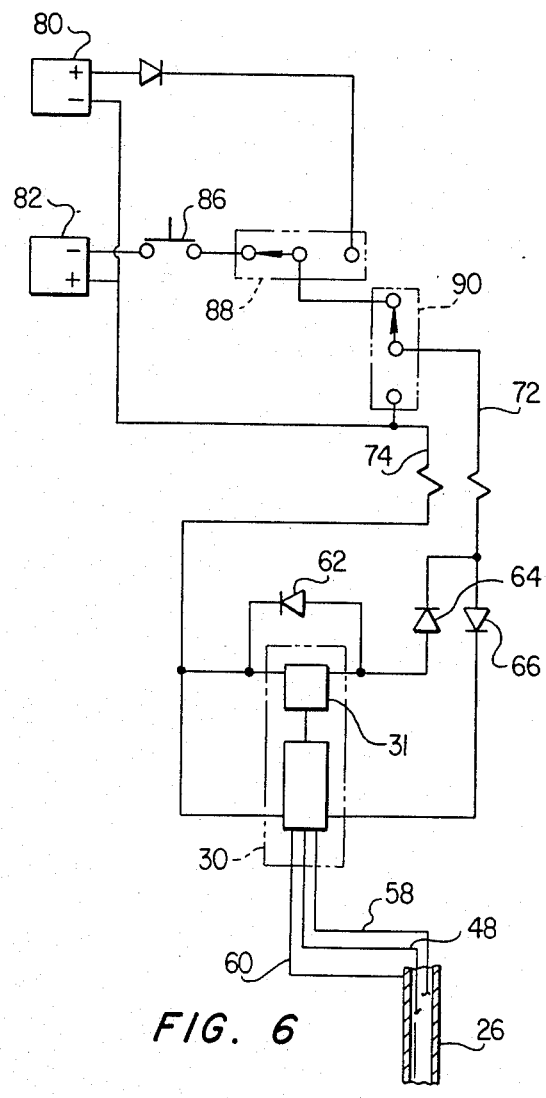
FIG. 6 is a schematic diagram showing a portion of the circuit for providing the selective seismic signals provided by the apparatus of the present invention.

Referring briefly to FIG. 6, the switch 30 is illustrated in a circuit which includes the leads 48 and 58 and a ground lead 60 suitably connected to the apparatus 20 in conductive relationship with the rod segments 26. The switch 30 includes an actuator or motor 31 which is disposed in a circuit including blocking diodes 62, 64, and 66, preferably disposed in the head 28. Suitable conductors 72 and 74 extend within the cable 22 and lead from a control unit 76, FIG. 1, disposed on the surface. The control unit 76 includes separate sources of DC voltage 80 and 82, FIG. 6, which are connected in circuit with a blocking diode 84 and switches 86, 88, and 90, as illustrated.

The switch 30 is of a stepping type wherein, with the delivery of a pulse signal to the actuator 31, the switch will index to a selected position for firing a selected one of the explosive charges 38. For example, with the switches 88 and 90 in the positions illustrated in FIG. 6, the switch 30 may be stepped to a selected position by actuation of the switch 86 to incrementally select the explosive charge 38 to be fired. The switch 90 is normally in the position opposite from that illustrated and is momentarily interposed in the circuit, as shown, to provide for incremental stepping of the switch 30 or for firing the selected explosive charge. When the switch 88 is placed in the opposite position and the switch 90 is moved to the position shown in FIG. 6, the selected charge is fired from the source 80.

By way of example, suitable seismic signals were generated at a borehole depth of about 2,000 feet using charge support rod segments 26 of approximately 10 foot lengths coupled end to end and formed of stainless steel tubing having a 1.75 inch outside diameter by a 0.50 inch wall thickness. Explosive charges 38 were provided in 33.0 inch lengths, were of a charge intensity rated at 80 grains of explosive per foot, were wrapped with 1.0 inches pitch and were separated by about 6 inches along the length of each rod. The sources 80 and 82 are 300 volt DC and 50 volt DC sources, respectively. At the above-mentioned depths, suitable seismic signals were obtained for a radius of up to 1,400 feet from the wellbore without damaging the casing and without damaging the apparatus 20. Since a total of 10 signals may be generated by coupling two 10-foot lengths of rod segments 26 end to end of the above-mentioned dimensions, considerable savings in time to obtain data for exploration and related activities may be obtained utilizing the apparatus of the present invention.

Although a preferred embodiment of the present invention has been described in detail herein, those skilled in the art will recognize that various substitutions and modifications may be made to the embodiment shown without departing from the scope and spirit of the invention as recited in the appended claims.

What we claim is:

1. Apparatus for generating multiple seismic signals in a borehole comprising:
    at least one elongated rod segment adapted to be inserted in said borehole and including means for coupling said rod segment to an elongated cable for lowering said rod segment into a predetermined selected position in said borehole;
    a plurality of explosive charge means spaced apart on and secured to said rod segment, said explosive charge means each including a length of explosive cord wrapped around the exterior of said rod segment, each of said explosive cords being of a predetermined length and of a predetermined charge intensity to provide a suitable acoustic signal in said borehole without damaging said borehole or said apparatus;

detonator means connected to one end of each of said explosive cords and connected to electrical conductors extending within a passage formed in said rod segment; and means including switch means connected to said conductors for selectively firing each of said explosive cords separately at will to generate multiple acoustic signals detectable from the earth's surface in the vicinity of said borehole.

2. The apparatus set forth in claim 1 wherein:

said rod segment includes blast baffle means interposed between each of said explosive charge means to minimize the blast effect on said explosive charge means adjacent the explosive charge means being fired.

3. The apparatus set forth in claim 1 including:

a plurality of said rod segments each including plural explosive cords wrapped on the exterior thereof, respectively and coupling means for coupling said rod segments in end to end relationship with each other without rotating said rod segments relative to each other during connection or disconnection of said rod segments, respectively.

4. The apparatus set forth in claim 1 including:

electrical circuit means for connection to respective ones of said explosive cords including selector switch means for selecting a predetermined one of said explosive cords to be fired, conductor means in communication with said selector switch means and with motor means for operating said selector switch means, a source of electric energy for operating said switch means and for igniting a detonator for a selected one of said explosive cords, said electrical source being adapted for reversing the polarity of an electrical signal conducted over said conductor means, and blocking diode means interposed in said conductor means and operable to provide for operating said motor means in response to a signal of one polarity and for energizing a selected one of said explosive cords when operating at the opposite polarity, and switch means for selecting the operating mode of said electrical source and said selector switch means.

5. Apparatus for generating multiple seismic signals in a borehole comprising:

at least one elongated rod segment adapted to be inserted in said borehole and including means for coupling said rod segment to an elongated cable for lowering said rod segment into a predetermined selected position in said borehole;

a plurality of explosive charge means spaced apart on and secured to said rod segment, said explosive charge means each including a length of explosive cord wrapped in a helical configuration around the exterior of said rod segment, each of said explosive cords being of a predetermined length and wrapped on said rod segment in a helical wrap of predetermined pitch;

blast baffles interposed between each of said explosive cords to minimize the blast effect on said explosive cord adjacent the explosive cord being fired, said blast baffles each comprising a generally circular member having an outer diameter greater than the outer diameter of said explosive cords wrapped on said rod segment to minimize damage to said explosive cords during insertion of said rod segment in said borehole; and means for selectively firing each of said explosive cords to generate a signal detectable from the earth's surface in the vicinity of said borehole.

6. Apparatus for generating multiple seismic signals in a borehole comprising:

a plurality of elongated rod segments adapted to be inserted in said borehole, coupling means for coupling said rod segments in end to end relationship to form a stem without rotating said rod segments relative to each other during connection or disconnection of said rod segments, and means for coupling one of said rod segment to an elongated cable for lowering said stem into a predetermined position in said borehole;

a plurality of explosive charge means spaced apart on and secured to said rod segments, each of said explosive charge means being of a predetermined charge intensity to provide a suitable acoustic signal in said borehole without damaging said borehole or said apparatus, said explosive charge means each including a length of explosive cord wrapped around the exterior of said rod segments, respectively, each of said explosive cords being of a predetermined length and wrapped on said rod segments in a helical wrap of predetermined pitch, respectively; and means for selectively firing said explosive charge means to generate multiple signals detectable in the vicinity of said borehole.

7. Apparatus for generating multiple seismic signals in a borehole comprising:

at least one elongated rod segment adapted to be inserted in said borehole and including means for coupling said rod segment to an elongated cable for lowering said rod segment into a predetermined selected position in said borehole;

a plurality of explosive charge means spaced apart on and secured to said rod segment, each of said charge means being of a predetermined charge intensity to provide a suitable acoustic signal in said borehole without damaging said borehole or said apparatus; blast baffle means interposed between each of said explosive charge means to minimize the blast effect on said explosive charge means adjacent the explosive charge means being fired, and said blast baffle means each comprising a generally circular member having an outer diameter sufficient to substantially centralize said apparatus in said borehole, said outer diameter being greater than the outer diameter of said charge means on said rod segment; and means for selectively firing each of said explosive charge means at will to generate multiple acoustic signals detectable from the earth's surface in the vicinity of said borehole.

8. Apparatus for generating multiple seismic signals in a borehole comprising:

a plurality of elongated rod segments coupled end to end and adapted to be inserted in said borehole and including means for coupling one of said rod segments to an elongated cable for lowering said rod segments into a predetermined selected position in said borehole;

a plurality of explosive charge means spaced apart on and secured to each of said rod segments, each of said charge means being of a predetermined charge intensity to provide a suitable acoustic signal in said borehole without damaging said borehole or said apparatus;

means for selectively firing each of said explosive charge means at will to generate multiple acoustic signals detectable from the earth's surface in the vicinity of said borehole; and coupling means for coupling said rod segments in end to end relationship with each other without rotating said rod segments relative to each other during connection or disconnection of said rod segments, respectively.

* * * * *